July 22, 1941.                E. B. THURSTON                2,250,141
                      SAFETY DEVICE FOR ELECTRIC MOTORS
                            Filed March 2, 1940
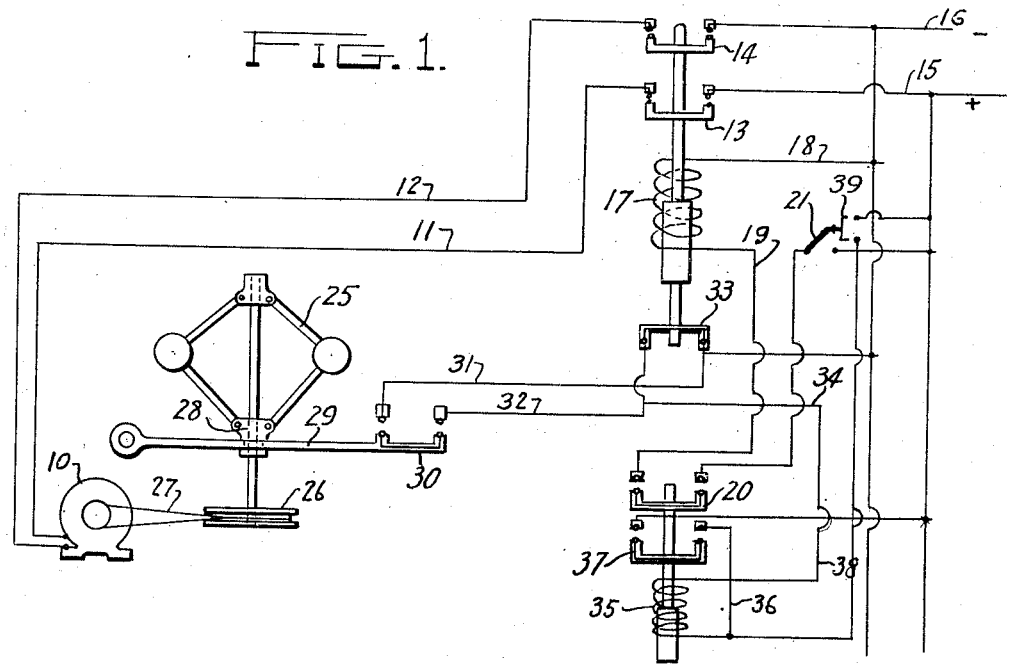
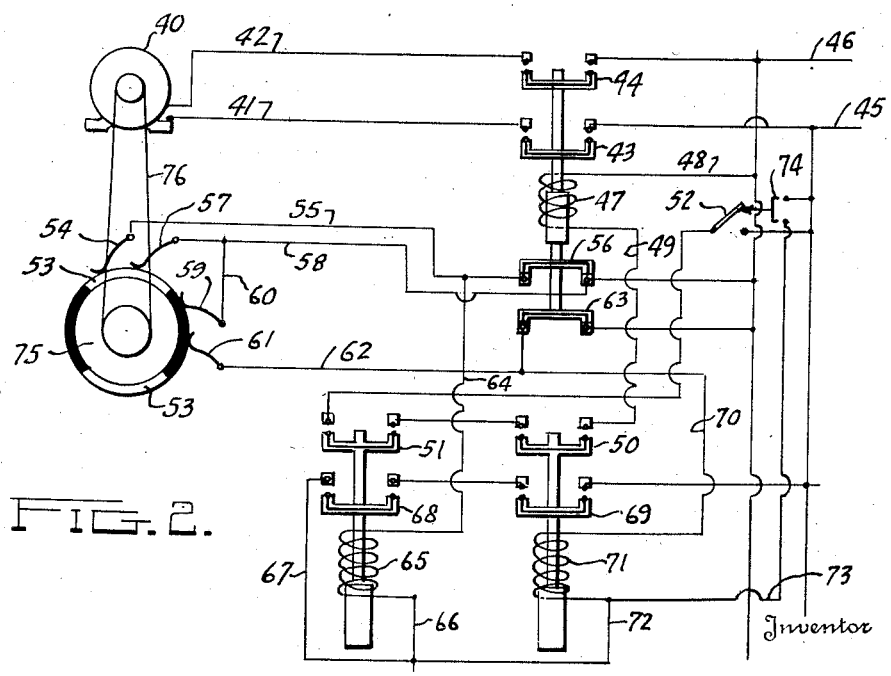
Inventor
Ernest B. Thurston
By Owen & Owen
Attorneys Patented July 22, 1941

2,250,141

UNITED STATES PATENT OFFICE 2,250,141

SAFETY DEVICE FOR ELECTRIC MOTORS

Ernest E. Thurston, Toledo, Ohio, assignor to The Haughton Elevator Company, Toledo, Ohio, a corporation of Ohio Application March 2, 1940, Serial No. 321,929

10 Claims. (Cl. 172—288)

This invention relates to a safety device for an electric motor which will de-energize the motor when it fails to start or to continue movement to a predetermined extent when energized.

More particularly it relates to a device of this kind arranged so that the motor will stop not only when the safety device is operating properly, but also whenever the safety device is not in proper operative condition.

When an electric motor fails to start properly or where it is overloaded or for any reason fails to continue movement at proper speed after being energized, it is necessary to cut off the power in order to avoid burning out the motor. Devices of this kind have been proposed and used to some extent, but these devices have been of a character which cut off the power only when the device was in proper working order, that is, if a contact failed to function or a wire in the safety device broke or any other feature of the safety device failed to work, then the power to the motor would continue whether or not the motor operated properly. Such a safety device does not afford complete protection since it may get out of order at the very time it is needed to protect the motor. It is the primary purpose of this invention to provide a safety device for the motor of such a character that the motor cannot be started and will not continue to operate unless the safety device is in proper working condition. This insures that the safety device will operate whenever the motor is operated and, therefore, is a complete safety device.

The objects and details of the invention will appear more fully as the description proceeds.

Figure 1 is a diagram of the wiring, suitable for one form of the invention;

Fig. 2 is a diagram of the wiring for a somewhat modified form of the invention.

In the embodiment of the invention disclosed in Fig. 1, there is a motor 10 connected by lines 11 and 12 through switches 13 and 14 to suitable power lines 15 and 16. Switches 13 and 14 are indicated as being controlled by a relay coil 17 which is connected through line 18 to power line 16 and is connected by line 19 through switches 20 and 21 to power line 15.

A speed governor 25 is indicated as being driven by a pulley 26 driven by a belt 27 from motor 10. The governor is provided with a reciprocating member 28 whose position is determined by the speed of the governor. Member 28 moves carrier 29 which supports switch 30. One contact of switch 30 is permanently connected through line 31 to line 16, while the other contact of the switch is connected by a line 32 through switch 33 to line 16. A branch 34 connected to line 32 between switches 30 and 33 leads to a time relay coil 35 which controls switch 20. The other end of the relay coil 35 is connected by a line 36 through switch 37 to power line 15. A branch 38 from line 36 is connected through switch 39 to line 15. The operation of the device is as follows: Presuming that the parts are in the position in which they are indicated on the drawing and it is desired to start the motor, starting switch 21 will be closed. In the form shown, the closing of the starting switch 21 temporarily closes switch 39, that switch again opening before switch 21 is completely closed. While switch 39 is closed, coil 35 is energized by the connection from line 15 through branch 38 and through line 34 and switch 33 to line 16. This action results in closing switches 20 and 37. When once closed, coil 35 will continue to be energized as long as switch 33 is closed since the connection to line 15 will continue through branch 36 and switch 37. The closing of switches 20 and 21 energizes relay coil 17 and if the connections are all operative, this results in a closing of switches 13 and 14 and consequent energizing of the motor.

The operation of relay 17 which closes switches 13 and 14 at the same time opens switch 33 and de-energizes coil 35. Unless connection between branch 34 and line 16 is reestablished within the time fixed by the time relay 35, switch 20 will drop open and the motor will be de-energized. If the motor starts properly governor 25 will be moved so as to lift member 28 and close switch 30, thereby reestablishing connection through lines 31 and 32 between power line 16 and branch 34. Therefore, the motor will continue to run normally until the starting switch is opened. If the speed drops at any time below the predetermined speed for which the governor is set, switch 30 will open, and after the predetermined interval time relay 35 will allow switch 20 to open, thereby de-energizing the motor. It will be readily seen that this result will be obtained not only if the motor fails to operate, but also if the safety device fails to operate. Any break in the operative lines of the safety device or any failure of any contact of that device to function properly will prevent the starting of the motor, or if it occurs during the operation of the motor, will result in stopping the motor. For this reason, the safety device must be in working order in order for the motor to function, and consequently the motor will not be run while the safety device is not functioning, and the safety device is operative to protect the motor whenever the motor is energized.

While a speed governor of the common ball type is illustrated in Fig. 1, it will be readily understood that a hydraulic pressure governor, friction drag governor, magnetic governor or any other suitable type of speed governor may be employed in place of governor 25.

While any suitable time relay may be employed an inductance relay is preferred, since its operation more nearly approaches perfect safety than dash pot types, for example. Where an inductance relay is employed with alternating current power, it will be readily understood that a rectifier is interposed in the lines of the relay. A one way rectifier is amply sufficient for such an inductance relay.

While for convenience there is illustrated an automatic switch 39 for insuring the energizing of coil 35 whenever the starting switch is moved from open to closed position, it will be readily understood that the closing of switches 20 and 37 may be accomplished manually or by distant control through a push button located and operated in any desired manner. When the switches 37 and 20 are once closed, it will be readily understood that they will remain closed automatically during proper operation of the apparatus regardless of how many times the motor is started and stopped, but switches 20 and 37 may be opened by any suitable means to avoid useless energizing of coal 35 when the motor is to be shut down for any lengthy period of time.

The form of the device illustrated in Fig. 2 operates in essentially the same manner as that disclosed in Fig. 1 except that a movement governor switch is employed in place of the speed governor. This is particularly suitable for use with elevators or like motors where there is great variation in the operative speeds of the motor.

In the particular embodiment of the invention disclosed in Fig. 2, there is a motor 40 connected by lines 41 and 42 through switches 43 and 44 with power lines 45 and 46. A relay coil 47 controlling switches 43 and 44 is connected by a line 48 with power line 46 and is connected by a line 49 through switches 50, 51 and 52 to power line 45. The movement governor switch comprises spaced contact members 53 which are attached in proper positions to bridge contacts. Contact 54 is shown as being connected through line 55 and switch 56 to power line 46, while contact 57 is connected permanently through line 58 to power line 46. Contact 59 is also connected through branch 60 to line 58 and power line 46. Contact 61 is connected by line 62 through switch 63 to power line 46. Branch 64 from line 55 between contact 54 and swith 56 is connected to one end of time relay coil 65. The lead 66 to the other end of coil 65 is connected by branch 67 through switches 68 and 69 with power line 45, while branch 70 from line 62 is connected with one end of time relay coil 71. The other end of time relay coil 71 is connected through branch 72 to lines 66 and 67, while it is connected by branch 73 through switch 74 to power line 45. The contacts 53 are carried by a rotating device 75 driven by a belt 76 or in other suitable manner from motor 40.

It is believed unnecessary to follow the operation of the wiring in Fig. 2 in detail since it operates in substantially the same manner as the connections shown in Fig. 1, except for the employment of the two time relays 65 and 71 which are connected with the two pairs of contacts. It will be readily seen that when contacts 54 and 57 are connected by one of the bridging members 53, then relay 65 may be energized in a manner substantially analogous to the energizing of time relay coil 35 in Fig. 1, but that at this time contacts 59 and 61 are not bridged and that, therefore, time relay coil 71 cannot be energized through this connection until the bridging member moves from the position in which it is shown to a position which will bridge contacts 59 and 61. Conversely, when contacts 59 and 61 are bridged, contacts 54 and 57 will not be connected. Since both relays 65 and 71 must be energized in order to continue the energization of the starting magnet operated switch 47, it will be evident that the motor operating circuit will be broken whenever member 75 fails to move a half turn, in the specific arrangement disclosed, during the time for which time relays 65 and 71 are adjusted. It will be readily understood that the moving member 75 may be connected in any suitable way with the motor and also that one or any greater number of separate bridging members 53 may be employed upon this moving governor switch.

The principle of operation having been disclosed and specific embodiments described with some indication of possible variations in the operative parts, it will be readily understood that other changes in details may be made within the scope of the appended claims and without departing from the principle of the invention.

What I claim is:

1. In combination with an electric motor and a switch controlling the flow of power to the motor, an electrical time relay comprising means to hold the switch closed while the relay is energized and to open the switch a predetermined time after the relay is de-energized, an electric circuit for energizing the relay, and means operated by the motor to open said circuit for a time as great as said predetermined time when the motor fails to move a predetermined amount within said predetermined time while said switch is closed.

2. In combination with an electric motor and a switch controlling the flow of power to the motor, an electrical time relay comprising means to hold the switch closed while the relay is energized and to open the switch a predetermined time after the relay is de-energized, an electric circuit for energizing the relay, a portion of said circuit being in parallel, a safety switch in one of the parallel lines, connections closing the safety switch when said controlling switch is open and opening the safety switch when said controlling switch is closed, a second safety switch in the other parallel line, and means operated by the motor and controlling said second safety switch to open it for a time as great as said predetermined time when the motor fails to move a predetermined amount within said predetermined time.

3. In combination with an electric motor, a suitable power line to the motor, a normally open switch in the power line, an electric relay closing the switch when energized, a manually operable starting switch for energizing said relay, a safety switch in series with said starting switch, an electrical time relay closing the safety switch when energized and opening the switch a predetermined time after it is de-energized, and means operated by the motor and energizing the time relay to keep the safety switch closed while the motor is operating properly.

4. In combination with an electric motor, a suitable power line to the motor, a normally open switch in the power line, an electric relay closing the switch when energized, a manually operable starting switch for energizing said relay, a safety switch in series with said starting switch, an electrical time relay closing the safety switch when energized and opening the switch a predetermined time after it is de-energized, a circuit for energizing the time relay, a switch in said circuit, mechanical connections opening the circuit switch when the power line switch is closed and closing the by-pass switch when the power line switch is opened, a normally open parallel circuit for energizing the time relay, and means for closing the last said circuit while the motor is operating up to a predetermined speed.

5. In combination with an electric motor having a power line leading thereto and a switch in the power line, an electrical time relay comprising a coil, said relay holding the said switch closed while the coil is energized and opening the switch a predetermined time after the coil is de-energized, and a governor driven by the motor and energizing the coil at least once during the lapse of each period equal to said predetermined time when driven to a predetermined speed and de-energizing the coil for a period greater than said predetermined time when the speed drops below a predetermined amount.

6. In combination with an electric motor, a starting switch and a safety switch, an electrical time relay having a coil, said relay closing said safety switch when the coil is energized and opening the safety switch a predetermined time after the coil is de-energized, a member operated by the motor and controlling a switch in a line energizing said coil when the motor is actuated to a predetermined speed and de-energizing said coil when the motor is below said predetermined speed, and a line in parallel with the line controlled by the movement of the motor and a switch in said parallel line closed when the starting switch is open and opened when the starting switch is closed.

7. In combination with an electric motor and a switch controlling the flow of power to the motor, an electrical time relay comprising means to hold the switch closed while the relay is energized and to open the switch a predetermined time after the relay is de-energized, an electric circuit for energizing the relay, a safety switch in said circuit, a governor controlled by the speed of the motor and maintaining the last said switch closed only while the motor moves as fast as a predetermined speed.

8. In combination with an electric motor and a switch controlling the flow of power to the motor, an electrical time relay comprising means to hold the switch closed while the relay is energized and to open the switch a predetermined time after the relay is de-energized, an electric circuit for energizing the relay, two safety switches in said circuit, a time relay for each switch, each relay comprising a coil closing the switch when energized and opening the switch a predetermined time after de-energization, and means operated by the motor and energizing said coils in alternation while the motor is moving, whereby at least one of said safety switches opens whenever the motor fails to operate said means rapidly enough to energize each coil within said predetermined time after it has been de-energized.

9. Apparatus in accordance with claim 8 and in which said means operated by the motor and energizing said coils in alternation comprises a rotating member driven by said motor and closing circuits through said coils in alternation.

10. Apparatus in accordance with claim 8 and in which said means operated by the motor and energizing said coils in alternation comprises a rotating member driven by said motor and carrying contacts bridging stationary contacts to close circuits through said coils in alternation.

ERNEST B. THURSTON.